United States Patent
Lim

(10) Patent No.: US 11,587,100 B2
(45) Date of Patent: Feb. 21, 2023

(54) USER INTERFACE FOR FRAUD DETECTION SYSTEM

(71) Applicant: EBAY KOREA CO., LTD., Seoul (KR)

(72) Inventor: Kwangtae Lim, Seoul (KR)

(73) Assignee: EBAY INC., San Jose, CA (US)

( * ) Notice: Subject to any disclaimer, the term of this patent is extended or adjusted under 35 U.S.C. 154(b) by 251 days.

(21) Appl. No.: 16/045,343

(22) Filed: Jul. 25, 2018

(65) Prior Publication Data

US 2020/0034853 A1   Jan. 30, 2020

Related U.S. Application Data

(63) Continuation of application No. 16/044,710, filed on Jul. 25, 2018, now abandoned.

(51) Int. Cl.
| | |
|---|---|
| *G06Q 30/00* | (2012.01) |
| *G06Q 30/018* | (2023.01) |
| *G06N 3/08* | (2023.01) |
| *G06Q 30/02* | (2023.01) |
| *G06Q 30/0601* | (2023.01) |
| *G06Q 20/40* | (2012.01) |

(52) U.S. Cl.
CPC .......... *G06Q 30/0185* (2013.01); *G06N 3/08* (2013.01); *G06Q 20/4016* (2013.01); *G06Q 30/02* (2013.01); *G06Q 30/0601* (2013.01); *G06Q 30/0609* (2013.01); *G06Q 30/0641* (2013.01)

(58) Field of Classification Search
CPC .......... G06Q 30/0185; G06Q 20/4016; G06Q 30/0609; G06Q 30/0601; G06Q 30/064; G06N 5/003; G06N 3/0455
See application file for complete search history.

(56) References Cited

U.S. PATENT DOCUMENTS

| | | | |
|---|---|---|---|
| 7,249,094 B2 | 7/2007 | Levchin et al. | |
| 7,562,814 B1 * | 7/2009 | Shao | G06F 21/552 235/375 |

(Continued)

FOREIGN PATENT DOCUMENTS

| | | |
|---|---|---|
| WO | 2006/060284 A2 | 6/2006 |
| WO | 2016/178225 A1 | 11/2016 |
| WO | 2018/136307 A1 | 7/2018 |

OTHER PUBLICATIONS

Amazon Anti-Counterfeiting Policy (Year: 2017).*

(Continued)

*Primary Examiner* — Aryan E Weisenfeld
(74) *Attorney, Agent, or Firm* — Shook, Hardy & Bacon, L.L.P.

(57) ABSTRACT

In an online marketplace, buyers and sellers engage in transactions. Some transactions are fraudulent. The online marketplace uses a fraud detection system that identifies fraudulent transactions before an account holder is defrauded. In some example embodiments of the systems and methods described herein, a fraud detection system uses information that is indirectly associated with a transaction to determine if the transaction is fraudulent. A user interface is provided that shows relationships between accounts and objects. In response to input received via the user interface, the fraud detection system performs an action on an account, an object, or a transaction.

17 Claims, 14 Drawing Sheets

(56) References Cited

U.S. PATENT DOCUMENTS

| | | | |
|---|---|---|---|
| 8,626,663 | B2 | 1/2014 | Nightengale et al. |
| 8,666,841 | B1 | 3/2014 | Claridge et al. |
| 10,366,378 | B1* | 7/2019 | Han .................. G06Q 20/401 |
| 10,505,893 | B1 | 12/2019 | Griggs et al. |
| 2003/0097330 | A1 | 5/2003 | Hillmer et al. |
| 2005/0289039 | A1 | 12/2005 | Greak et al. |
| 2008/0103800 | A1* | 5/2008 | Domenikos ........ G06Q 30/0185 705/318 |
| 2008/0109392 | A1 | 5/2008 | Nandy |
| 2008/0306830 | A1 | 12/2008 | Lasa et al. |
| 2009/0044279 | A1 | 2/2009 | Crawford et al. |
| 2010/0004965 | A1 | 1/2010 | Eisen |
| 2010/0100492 | A1* | 4/2010 | Law .................. G06Q 50/01 705/319 |
| 2011/0022483 | A1 | 1/2011 | Hammad |
| 2011/0238575 | A1 | 9/2011 | Nightengale et al. |
| 2014/0201048 | A1 | 7/2014 | Lin et al. |
| 2016/0140561 | A1 | 5/2016 | Cowan |
| 2017/0178139 | A1 | 6/2017 | Gieseke |
| 2020/0034852 | A1 | 1/2020 | Lim |

OTHER PUBLICATIONS

Data-Driven Documents, Retrieved from the Internet URL: <https://d3js.org/>, Accessed on Jul. 30, 2020, 4 pages.

"Infinitegraph", Retrieved from the Internet URL: < http://www.objectivity.com/products/infinitegraph/>, Accessed on Jul. 30, 2020, 3 pages.

Neo4j (Graph DB), Retrieved from the Internet URL: <https://neo4j.com>, Accessed on Jul. 30, 2020, 13 pages.

Node.js Express, Retrieved from the Internet URL: <https://www.npmjs.com/package/express>, Accessed on Jul. 30, 2020, 7 pages.

Non Final Office Action Received for U.S. Appl. No. 16/044,710, dated Nov. 3, 2020, 17 pages.

Response to Restriction Requirement filed on Oct. 19, 2020 for U.S. Appl. No. 16/044,710, dated Aug. 17, 2020, 10 pages.

Restriction Requirement Received for U.S. Appl. No. 16/044,710, dated Aug. 17, 2020, 6 pages.

Bostock,"New D3 Gallery", Retrieved from the Internet URL: < https://github.com/d3/d3/wiki/Gallery>, Mar. 7, 2020, 43 pages.

Final Office Action Received for U.S. Appl. No. 16/044,710 dated Feb. 10, 2021, 21 pages.

Caldeira et al., "Fraud Analysis and Prevention in E-commerce Transactions", 9th Latin American Web Congress, 2014, pp. 42-49.

Final Office Action received for U.S. Appl. No. 16/044,710, dated Jan. 24, 2022, 34 pages.

Restriction Requirement received for U.S. Appl. No. 16/044,710, dated Nov. 9, 2021, 8 pages.

Anonymous, "United States: Canadian Man Charged in First Federal Securities Fraud Prosecution Involving Layering", Asia News Monitor, Jan. 31, 2015, 28 pages.

Narayan et al., "Scanner on 25-year-old in Rs 1 Cr Scam [Mumbai]", The Times of India, Feb. 8, 2013, 2 pages.

Sadaoui et al., "A Dynamic Stage-based Fraud Monitoring Framework of Multiple Live Auctions", Applied Intelligence, © Springer Science+Business Media New York 2016, Aug. 11, 2016, 17 pages.

Non-Final Office Action received for U.S. Appl. No. 16/044,710, dated Jul. 27, 2021, 29 pages.

My Market Research, "Types of Data & Measurement Scales: Nominal, Ordinal, Interval and Ratio", Retrieved from the Internet URL: <https://web.archive.org/web/20150317080920/http://www.mymarketresearchmethods.com: 80/types-of-data-nominal-ordinal-interval-ratio>, Nov. 28, 2012, 7 pages.

Newsom, "Types of Scales & Levels of Measurement", Retrieved from the Internet URL: <https://web.archive.org/web/20170129235515/http://web.pdx.edu/~newsomj/pa551/lecture1.htm>>, Jan. 29, 2017, 4 pages.

\* cited by examiner

EVENT TABLE 300

| | DATE TIME | ACCOUNT | ACCT SCORE | BEHAVIOR | BEHAVIOR SCORE | OBJECT | OBJECT SCORE | INSTANCE SCORE |
|---|---|---|---|---|---|---|---|---|
| 330A | 6/14/2018 13:02:05.93 | 101 | 7 | 11 | 12 | 1001 | 9 | 12 |
| 330B | 6/14/2018 14:23:06.07 | 101 | 7 | 13 | 10 | 1001 | 9 | 10 |
| 330C | 6/14/2018 14:23:06.07 | 102 | 14 | 12 | 7 | 1001 | 9 | 14 |
| 330D | 6/15/2018 1:07:02.30 | 101 | 7 | 13 | 10 | 1003 | 5 | 10 |

310 — 320 — 330A–330D

AGGREGATE TABLE 340

| | LAST DATE TIME | ACCOUNT | OBJECT | AGGREGATE SCORE |
|---|---|---|---|---|
| 360A | 6/14/2018 14:23:06.07 | 101 | 1001 | 12 |
| 360B | 6/14/2018 14:23:06.07 | 102 | 1001 | 14 |

*FIG. 3*

USER INTERFACE FOR FRAUD DETECTION SYSTEM

PRIORITY CLAIM

This application claims the benefit of priority to U.S. patent application Ser. No. 16/044,710, filed Jul. 25, 2018, and titled "Fraud Detection System," which application is incorporated herein by reference in its entirety.

TECHNICAL FIELD

The subject matter disclosed herein generally relates to user interfaces for fraud detection. Specifically, in some example embodiments, the present disclosure addresses systems and methods, including user interfaces, for detecting fraud, controlling a fraud detection system, and taking action in response to the detection of fraud.

BACKGROUND

Fraud detection systems identify fraudulent transactions based on data directly associated with the transaction. For example, a transaction by an account known to commit fraud, a transaction being paid for using a credit card known to be used in fraudulent transactions, and a transaction for an item to be shipped to a shipping address known to be used for fraudulent transactions may all be identified as fraudulent.

BRIEF DESCRIPTION OF THE DRAWINGS

Some embodiments are illustrated by way of example and not limitation in the figures of the accompanying drawings.

FIG. 3 is a block diagram illustrating a database schema suitable for fraud detection, according to some example embodiments.

DETAILED DESCRIPTION

Figure 1:
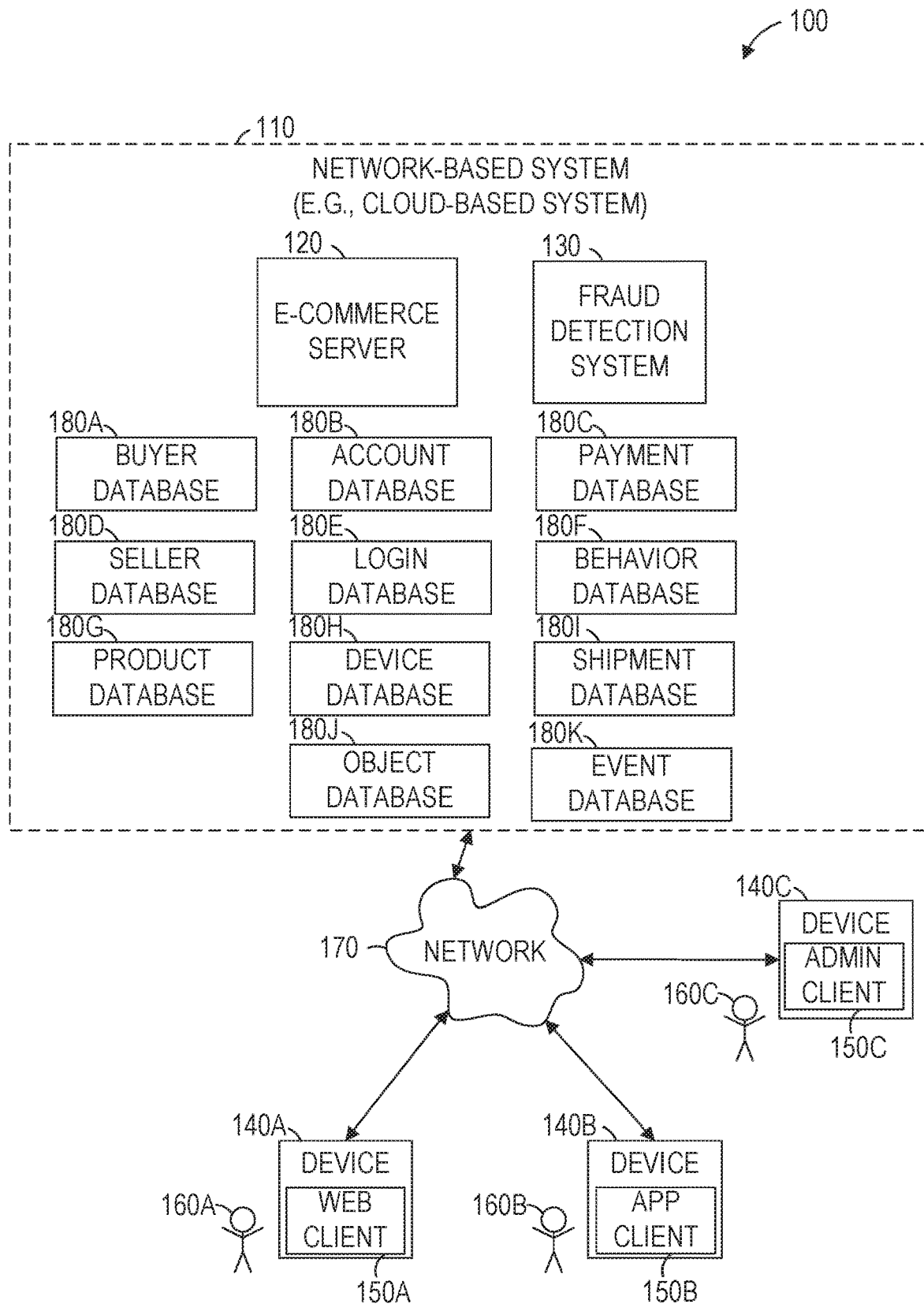
FIG. 1 is a network diagram illustrating a network environment suitable for fraud detection, according to some example embodiments.

Example methods and systems are directed to user interfaces for fraud detection systems. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In an online environment, such as an online marketplace, account holders (e.g., buyers and sellers) engage in transactions. Each transaction is associated with a buyer account, a seller account, an item, a price, and a payment method. A transaction may also be associated with one or more of a source address, a destination address, a shipping method, a buyer account connection method, a seller account connection method, and other details related to the transaction.

Some transactions are fraudulent. Buyer fraud involves deception by a buyer, such as the buyer failing to pay for an item at the agreed-upon price, the buyer falsely claiming that the item is defective after delivery, or the buyer falsely claiming that the item was not received. Seller fraud involves deception by a seller, such as the seller failing to ship the item at all, the seller demanding additional fees after the price is agreed to in order to ship the item, the seller shipping a different item than agreed to, or the seller deliberately providing a defective item.

The online environment may use a fraud detection system that identifies fraudulent transactions before the buyer or the seller is defrauded. Existing fraud detection systems identify individual risk factors, such as a buyer or seller account associated with prior fraudulent activity, a geographic region associated with prior fraudulent activity (e.g., a seller's address, seller's city, seller's zip code, a buyer's address, buyer's city, or buyer's zip code), a payment method associated with prior fraudulent activity, or a shipping method associated with prior fraudulent activity. If any individual risk factor exceeds a predetermined threshold, the transaction is flagged as fraudulent.

In some example embodiments of the systems and methods described herein, the fraud detection system uses additional information that is indirectly associated with the transaction to determine if the transaction is fraudulent. In a first example, an Internet protocol (IP) address may be used by a first account to commit fraud in a first transaction. The same IP address may be used by a second account in a genuine second transaction. The second account may use a different IP address to participate in a third transaction. On the basis that the second account is associated with an IP address associated with fraud, the fraud detection system increases a fraud score for the third transaction. In a second example, a particular object may be used by a first account in a fraudulent transaction. The mentioned particular object may be used by second account in a different transaction. In this case, the second transaction has a high probability of being fraudulent. The second account associated with the fraudulent object may take part in a third transaction. On the basis that the second account used an object involved in a fraudulent transaction, the fraud score for the third transaction is increased by fraud detection system.

In some example embodiments of the systems and methods described herein, the fraud detection system causes presentation of a user interface (UI) that displays a first set of graphical elements corresponding to at least a subset of the user accounts of the online environment and a second set of graphical elements corresponding to at least a subset of objects used by the user accounts. In this context, an object refers to any data associated with a transaction that is under the control of the user, excluding the accounts themselves. For example, shipping address, payment method, price, item being transacted, and the device used to connect to the online environment are all objects.

The UI may show links between each first graphical element and the associated second graphical elements. For example, a first line may be drawn between the graphical element for a first user account and the graphical element for an item bought by the first user account, a second line may be drawn between the graphical element for the first user account and the graphical element for the device used by the first user account to buy the item, and a third line may be drawn between the graphical element for a second user account and the item, wherein the second user account was the seller of the item.

The UI may indicate which accounts and objects are associated with fraud by modifying one or more attributes of the graphical elements or links corresponding to the accounts and objects. For example, the graphical element for a first account for which fraud is detected may be shown in red and the graphical element for a second account for which fraud is not detected may be shown in green. As another example, the lines connecting the graphical element for the first account to the graphical elements for objects associated with the first account may be shown in red and the lines connecting the graphical element for the second account may be shown in blue.

An administrator may use the UI to manipulate the fraud detection system, the accounts, or both. For example, the fraud detection system may receive input via the UI that indicates a first graphical element for an account and a second graphical element for an object. In response, the fraud detection system may create an association between the account and the object, remove an association between the account and the object, alter a fraud detection associated with the account, alter a fraud detection associated with the object, or any suitable combination thereof.

Technical problems exist with respect to accurately generating data that corresponds to detected fraudulent behavior. The systems and methods described herein address these problems by focusing on highly risky transactions using relational analysis with continuous fraud score update. As a result of this technical improvement, errors in fraud detection are reduced, increasing the number of fraudulent transactions that can be prevented and decreasing the number of non-fraudulent transactions that are incorrectly interfered with due to suspected fraud.

Additionally, technical problems exist with timely generating data that corresponds to detected fraudulent behavior. The systems and methods described herein address these problems by focusing on highly risky transactions during specific period of time using relational analysis with continuously updating aggregated fraud score. As a result of this technical improvement, data for fewer transactions are needed to generate accurate fraud detection, allowing fraudulent activity to be detected sooner.

Further technical problems exist with the security of computer data and machines. Preventing connections from systems and accounts associated with malicious activity helps protect the security of computer data and machines. The systems and methods described herein address these problems by using data indirectly associated with systems and accounts to detect malicious behavior. As a result of this technical improvement, malicious connections can be detected more accurately and more quickly, improving the security of computer data and machines.

Additionally, computing resources may be saved by using the systems and methods described herein, which is a further technical improvement. Examples of such computing resources include processor cycles, network traffic, memory usage, data storage capacity, power consumption, and cooling capacity.

FIG. 1 is a network diagram illustrating a network environment 100 suitable for fraud detection, according to some example embodiments. The network environment 100 includes a network-based system 110, device 140A, device 140B, and device 140C all communicatively coupled to each other via a network 170. The devices 140A-140C may be collectively referred to as "devices 140," or generically referred to as a "device 140." The network-based system 110 comprises an e-commerce server 120 and a fraud detection system 130, making use of a buyer database 180A, an account database 180B, a payment database 180C, a seller database 180D, a login database 180E, a behavior database 180F, a product database 180G, a device database 180H, a shipment database 180I, an object database 180J, and an event database 180K. The databases 180A-180K may be referred to collectively as "databases 180" or referred to generically as "a database 180." The contents of the databases 180 may be divided into additional databases or combined into fewer databases. The devices 140 may interact with the network-based system 110 using a web client 150A or an app client 150B. The administrative client 150C may be implemented as either a web client or an app client. The e-commerce server 120, the fraud detection system 130, and the devices 140 may each be implemented in a computer system, in whole or in part, as described below with respect to FIGS. 11-12.

The e-commerce server 120 provides an electronic commerce application to other machines (e.g., the devices 140) via the network 170. The electronic commerce application provides a way for users to buy and sell items directly from and to each other, to buy from and sell to the electronic commerce application provider, or both. An item listing describes an item that can be purchased. For example, a user may create an item listing that describes an item owned by the user that may be purchased by another user via the e-commerce server 120. Item listings include text, one or more images, or both.

The payment database 180C, login database 180E, and behavior database 180F store data related to account behaviors, such as login data, payment data, browsing data, and the like. The buyer database 180A, account database 180B, and seller database 180D store data related to buyers, sellers, and accounts. The product database 180G, device database 180H, shipment database 180I, and object database 180J store data related to items purchased or for sale, devices used to connect to the network-based system 110, shipment addresses, and other objects. The event database 180K stores data related to individual and aggregated events, such as instances of accounts performing behaviors on or with objects.

Also shown in FIG. 1 are users 160A, 160B, and 160C that may be referred to generically as "a user 160" or collectively as "users 160." Each user 160 may be a human user (e.g., a human being), a machine user (e.g., a computer configured by a software program to interact with the devices 140 and the e-commerce server 120), or any suitable combination thereof (e.g., a human assisted by a machine or a machine supervised by a human). The users 160 are not part of the network environment 100, but are each associated with one or more of the devices 140 and may be users of the devices 140 (e.g., the user 160A may be an owner of the device 140A and the user 160B may be an owner of the device 140B). For example, the device 140A may be a desktop computer, a vehicle computer, a tablet computer, a navigational device, a portable media device, or a smart phone belonging to the user 160A.

In some example embodiments, the e-commerce server 120 receives information from the user 160A for an item being listed for sale by the user 160A. The information received from the user 160A may include a description of the item and a price for the item. The e-commerce server 120 may also receive information from the user 160B requesting to purchase the listed item. The information received from the user 160B may include a payment method and a shipping address. Based on one or more of the information provided by each user, prior transactions by the users, prior transactions associated with the objects referenced in the transaction, or prior transactions associated with objects associated with the users in prior transactions involving the users, the fraud detection system 130 determines that the proposed transaction between the users 160A and 160B is fraudulent. In response to the determination that the proposed transaction is fraudulent, the e-commerce server 120 cancels the transaction, disables an account of one or both of the users 160A and 160B, or takes another action.

The fraud detection system 130 causes presentation of a UI (e.g., on the administrative client 150C) that shows a graphical representation of one or more of an account of the user 160A, an account of the user 160B, the device 140A used by the user 160A, the device 140B used by the user 160B, the item listed for sale by the user 160A, other items transacted by the user 160A, other items transacted by the user 160B, other devices used by the account of the user 160A, other devices used by the account of the user 160B, or other accounts associated with the aforementioned items and devices.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 2. As used herein, a "database" is a data storage resource that stores data structured as a text file, a table, a spreadsheet, a relational database (e.g., an object-relational database, a NoSQL database, a network or graph database), a triple store, a hierarchical data store, or any suitable combination thereof. Additionally, data accessed (or stored) via an application programming interface (API) or remote procedure call (RPC) may be considered to be accessed from (or stored to) a database. Moreover, any two or more of the machines, databases, or devices illustrated in FIG. 1 may be combined into a single machine, database, or device, and the functions described herein for any single machine, database, or device may be subdivided among multiple machines, databases, or devices.

The network 170 may be any network that enables communication between or among machines, databases, and devices (e.g., the e-commerce server 120 and the devices 140). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
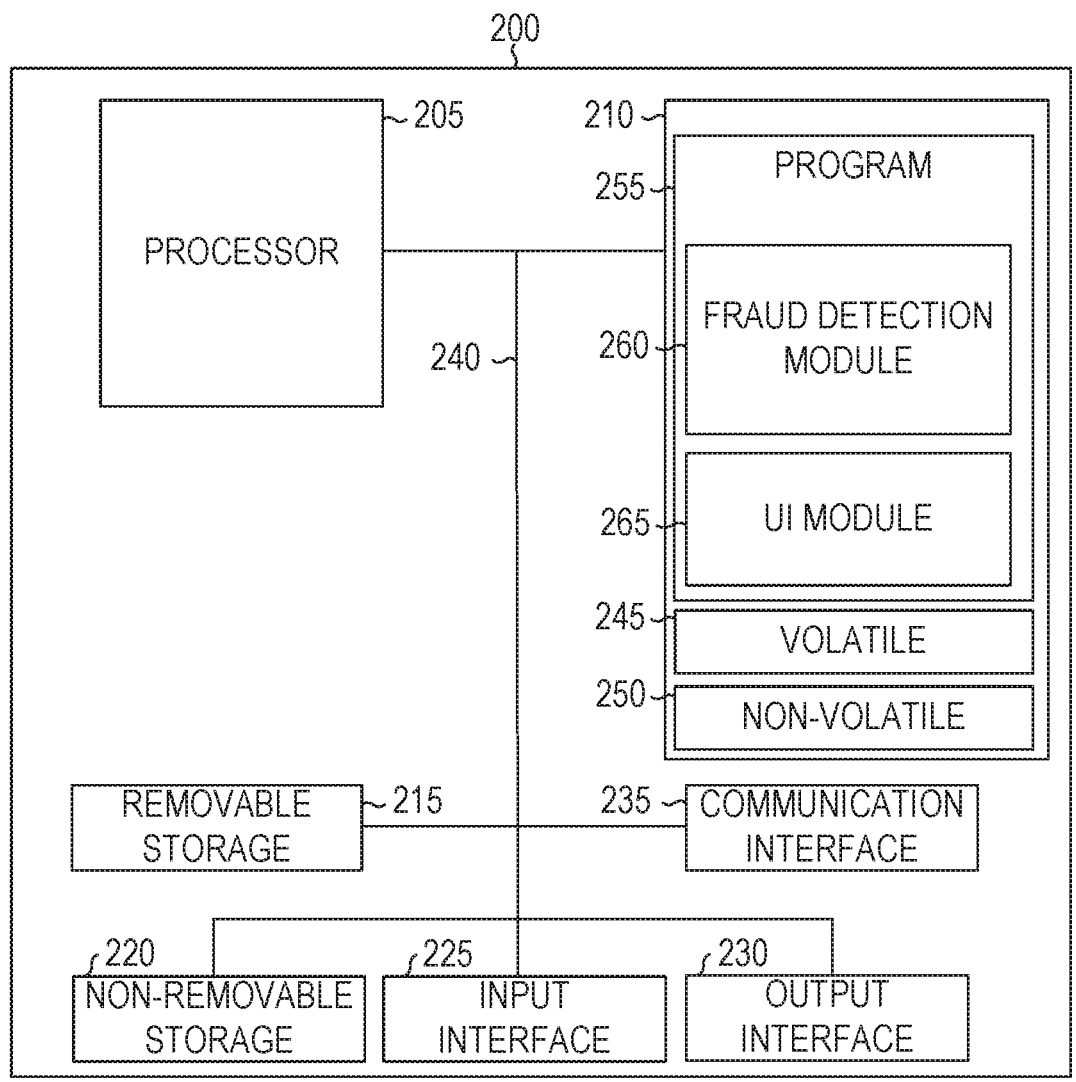
FIG. 2 is a block diagram illustrating components of a fraud detection system, according to some example embodiments.

FIG. 2 is a block diagram illustrating components of the fraud detection system 130, according to some example embodiments. All components need not be used in various embodiments. For example, clients, servers, autonomous systems, and cloud-based network resources may each use a different set of components, or, in the case of servers for example, larger storage devices.

One example computing device in the form of a computer 200 (also referred to as computing device 200 and computer system 200) may include a processor 205, computer-storage medium 210, removable storage 215, and non-removable storage 220, all connected by a bus 240. Although the example computing device is illustrated and described as the computer 200, the computing device may be in different forms in different embodiments. For example, the computing device 200 may instead be a smartphone, a tablet, a smartwatch, or another computing device including elements the same as or similar to those illustrated and described with regard to FIG. 2. Devices such as smartphones, tablets, and smartwatches are collectively referred to as "mobile devices." Further, although the various data storage elements are illustrated as part of the computer 200, the storage may also or alternatively include cloud-based storage accessible via a network, such as the Internet, or server-based storage.

The computer-storage medium 210 includes volatile memory 245 and non-volatile memory 250, and stores a program 255. The computer 200 may include, or have access to, a computing environment that includes a variety of computer-readable media, such as the volatile memory 245, the non-volatile memory 250, the removable storage 215, and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 includes or has access to a computing environment that includes an input interface 225, an output interface 230, and a communication interface 235. The output interface 230 interfaces to or includes a display device, such as a touchscreen, that also may serve as an input device. The input interface 225 interfaces to or includes one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, network PC, peer device or other common network node, or the like. The communication interface 235 may connect to a local-area network (LAN), a wide-area network (WAN), a cellular network, a WiFi network, a BLUETOOTH network, or other networks.

Computer instructions stored on a computer-storage medium (e.g., the program 255 stored in the computer-storage medium 210) are executable by the processor 205 of the computer 200. As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

The program 255 is shown as including a fraud detection module 260 and a UI module 265. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The fraud detection module 260 analyzes transactions and determines which transactions are fraudulent. The determination that a transaction is fraudulent may be based on data stored in the databases 180, output from a machine learning algorithm, or any suitable combination thereof. In some example embodiments, data indirectly associated with the transaction is used to determine if the transaction is fraudulent.

The UI module 265 causes presentation of a UI for the fraud detection system 130 to the user 160C. The UI allows the user 160C to view relationships between accounts and objects, to manipulate relationships between accounts and objects, to manipulate fraud scores associated with accounts and objects, to cancel transactions, to disable accounts, or any suitable combination thereof. For example, by interacting with a UI caused to be presented by the UI module 265, the user 160C may disable an account associated with fraudulent activity.

FIG. 3 is a block diagram illustrating a database schema 300 suitable for fraud detection, according to some example embodiments. The database schema 300 may be suitable for use in the event database 180K and includes an event table 310 and an aggregate table 340. The event table 310 is defined by a table definition 320, including a date time field, an account field, an account score field, a behavior field, a behavior score field, an object field, an object score field, and an instance score field, and includes rows 330A, 330B, 330C, and 330D. The aggregate table 340 is defined by a table definition 350, including a last date time field, an account field, an object field, and an aggregate score field, and includes rows 360A and 360B.

Each of the rows 330A-330D stores information for an event. Each event is a behavior performed by an account on or with an object. The date time field stores the date and time at which the event occurred. The account field stores a unique identifier for the account involved in the event (e.g., a buyer account or a seller account). The behavior field stores a unique identifier for the behavior of the event (e.g., logging into an e-commerce system, selling an item via the e-commerce system, buying an item via the e-commerce system, or searching for items on the e-commerce system). The object field stores a unique identifier for the object of the event (e.g., a device used to connect to the e-commerce system, an item sold via the e-commerce system, an item bought via the e-commerce system, or search parameters used for searching on the e-commerce system). The account score field stores a fraud detection score corresponding to the account. Similarly, the behavior score field stores a fraud detection score corresponding to the behavior and the object score stores a fraud detection score corresponding to the object. The instance score field stores a fraud detection score for the event. In some example embodiments, the instance score is a maximum of the account score, the behavior score, and the object score. In other example embodiments, the instance score is an output from a machine learning algorithm that accepts the account score, the behavior score, and the object score as inputs.

In the example of FIG. 3, the account 101 and the account 102 are two different accounts. The behavior 11 is a behavior of creating a listing of an item for sale. The behavior 12 is a behavior of buying a listed item. The behavior 13 is a behavior of selling a listed item. The object 1001 is the item listed by the account 101 and purchased by the account 102.

Each of the rows 360A and 360B stores information for an aggregation of one or more events in the event table 310. The aggregated events involve the same account and object, but different behaviors. The account and object fields store the identifiers of the account and object that are common to the aggregated events. The last date time field stores the date time of the last of the aggregated events. The aggregate score field stores an aggregate fraud detection score based on the information in the rows in the event table used to generate the aggregated event. Criteria for aggregating events may include temporal proximity of the events, the behaviors of the events, the accounts of the events, the objects of the events, or any suitable combination thereof. For example, the rows 330A and 330B may be aggregated into the aggregate event of the row 360A based on the row 330A representing a listing of the object 1001 for sale and the row 330B representing the sale of the object via the listing. The row 360B may represent, as an aggregate event, the purchase of the item 1001 by the account 102, represented as an individual event by the row 330C.

Other example events include an event with a behavior for shipping the object by the account after the object is sold, an event with a behavior for receiving the object by the account after the object is shipped, an event with a behavior for paying for the object by the account after the object is purchased, an event with a behavior for requesting a refund by the account for the object, an event with a behavior for cancelling a transaction by the account for the object, or any of the foregoing events wherein the object is the device used by the account to connect to the online environment while performing the behavior.

Figure 4:
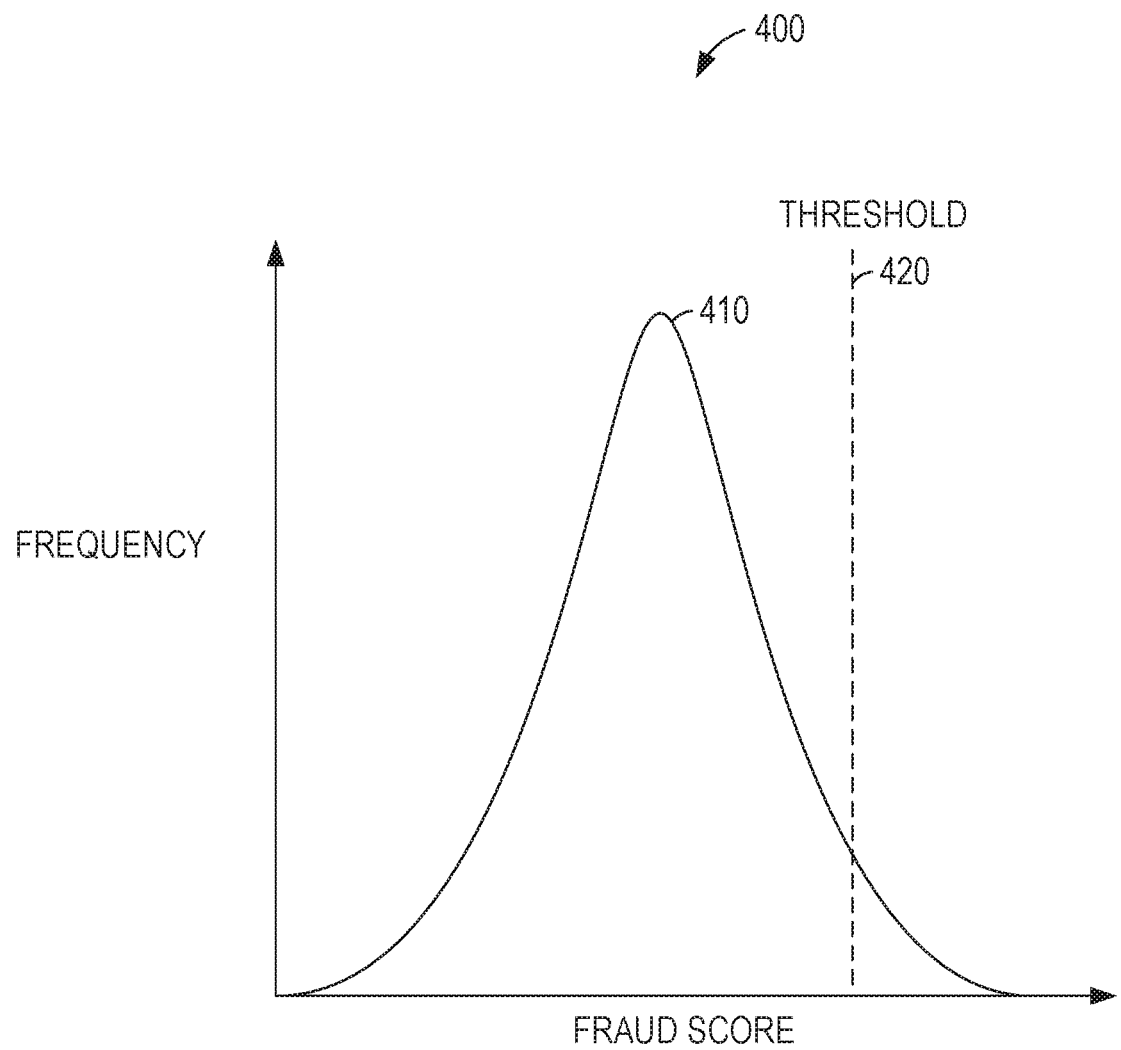
FIG. 4 is a graph illustrating a fraud detection threshold, according to some example embodiments.

FIG. 4 is a graph 400 illustrating a fraud detection threshold 420, according to some example embodiments. The graph 400 also shows a frequency curve 410. The frequency curve 410 shows the frequency with which each fraud score is observed. A fraud score may be associated with a behavior, an account, an object, an event, an aggregate event, or any suitable combination thereof. A fraud score is compared with the fraud detection threshold 420 to determine if the associated element is fraudulent. The fraud detection threshold 420 may be a predetermined value defined by the system or an administrator, may be set so that a predetermined percentage of fraud scores exceed the threshold (e.g., 5%, 10% or another value), may be set by a machine learning algorithm to a value that minimizes false positives, minimizes false negatives, or minimizes an error rate, or any suitable combination thereof.

Figure 5:
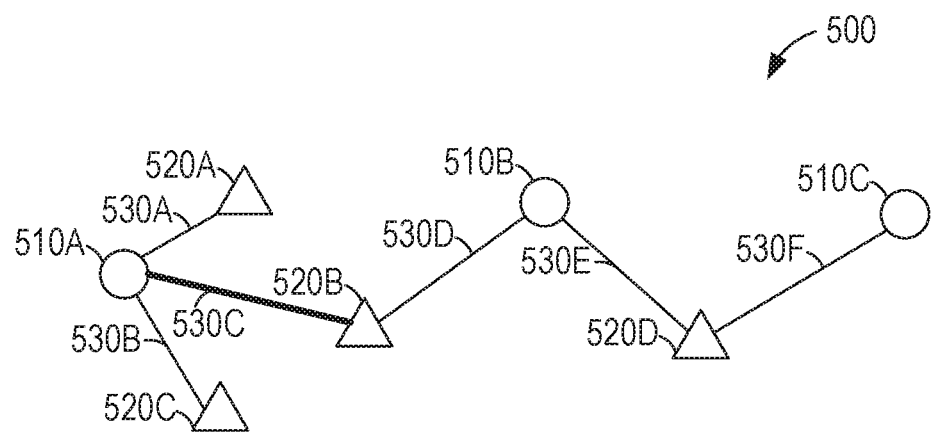
FIG. 5 is a graph illustrating relationships between accounts and objects, according to some example embodiments.

FIG. 5 is a graph 500 illustrating relationships between accounts and objects, according to some example embodiments. The graph 500 includes nodes 510A, 510B, and 510C that each represent an account, as well as nodes 520A, 520B, 520C, and 520D that each represent an object. Some pairs of nodes are connected by one of the links 530A, 530B, 530C, 530D, 530E, and 530F. The nodes representing accounts may be displayed with one or more attributes in common that are different from the corresponding attributes of the nodes representing objects. For example, in FIG. 5, each of the nodes 510A-510C has the shape of a circle and each of the nodes 520A-520D has the shape of a triangle. Thus, the attribute of shape may be used to identify whether each node represents an account or an object. In other example embodiments, other attributes may be used to identify the two types of nodes, such as color or size.

One or more attributes of each of the links 530A-530F may be used to indicate information about a relationship between the object and the account represented by the connected nodes. For example, the thickness of the link may indicate a strength of a relationship. Thus, in this example, the link 530C, which is thicker than the other links, indicates that the account node 510A has a stronger relationship with the object node 520B than the relationships indicated by the other links. Strength of a relationship between an account and an object may be determined based on a number of events involving both the account and the object, behaviors of events involving both the account and the object, recency of events involving both the account and the object, or any suitable combination thereof. The strength of a relationship may be used as a weighting factor in determining a fraud score. In these example embodiments, the fraud detection system treats the strength of a relationship as factor in determining how much the fraud score of the object affects the fraud score of the account, or vice versa. Colloquially, the risk of fraud is contagious, and the chance of transmission increases due to close proximity. For example, an address associated with fraud is an object with a high fraud score. The fraud score of an account that frequently uses the address is increased by a larger amount than the fraud score of an account that uses the address less frequently.

Detected fraud may be indicated in the graph 500 by one or more attributes of nodes, links, or both. For example, account nodes, object nodes, and links associated with fraud may be displayed in red, while other colors are used for nodes and links not associated with fraud.

Figure 6:
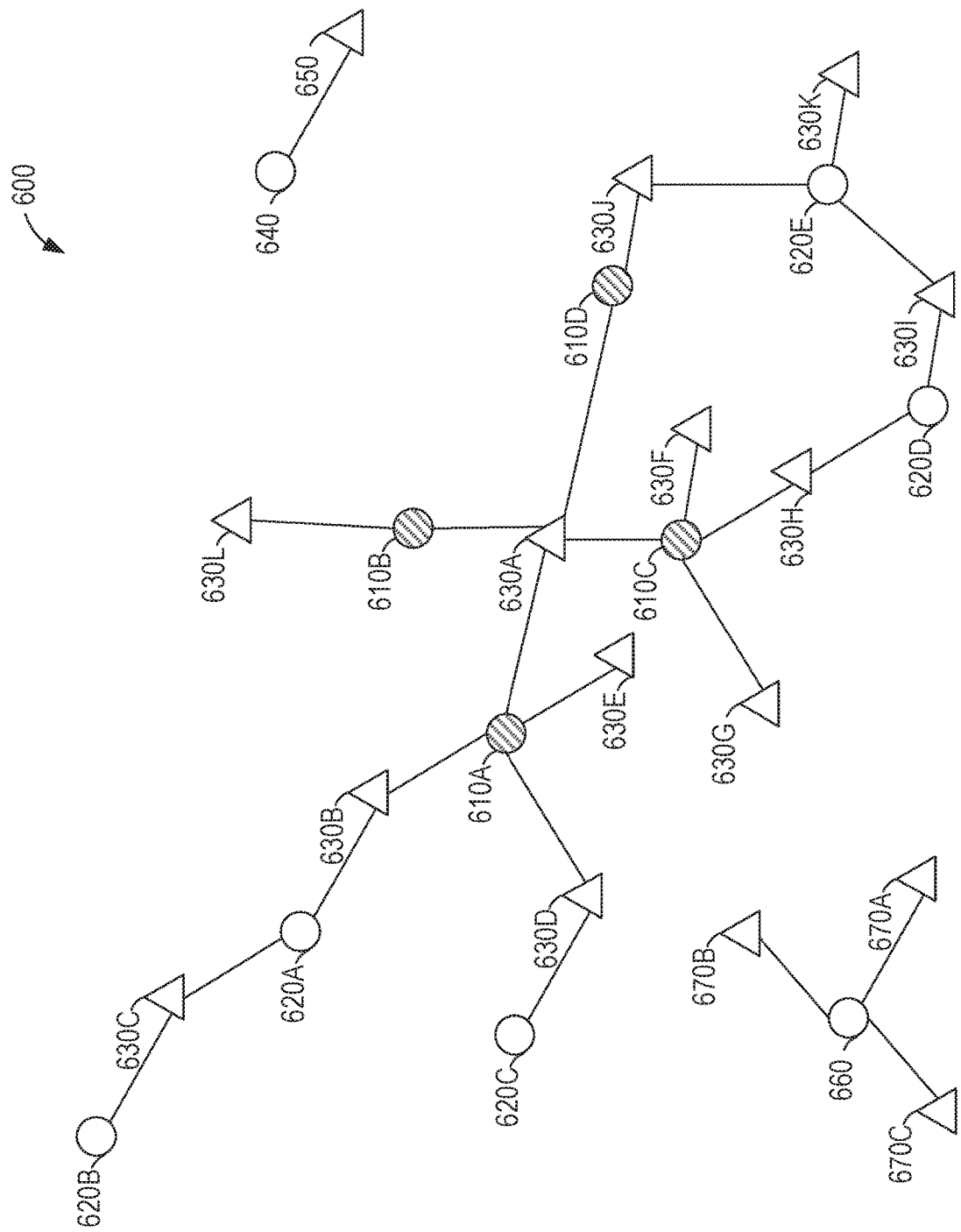
FIG. 6 is a graph illustrating relationships between accounts and objects, according to some example embodiments.

FIG. 6 is a graph 600 illustrating relationships between accounts and objects, according to some example embodiments. The graph 600 includes nodes 610A, 610B, 610C, 610D, 620A, 620B, 620C, 620D, 620E, 640, and 660, each representing an account, as well as nodes 630A, 630B, 630C, 630D, 630E, 630F, 630G, 630H, 630I, 630J, 630K, 630L, 650, 670A, 670B, and 670C, each representing an object. Some pairs of nodes are connected by links. The nodes representing accounts or objects associated with fraud may be displayed with one or more attributes in common that are different from the corresponding attributes of the nodes representing accounts or objects not associated with fraud. For example, in FIG. 6, each of the nodes 610A-610D has a hatch fill pattern and each of the other nodes has a solid or no fill pattern. In other example embodiments, other attributes may be used to identify the accounts or objects associated with fraud, such as color or size. As can be seen in FIG. 6, multiple separate clusters of nodes may be formed.

Figure 7:
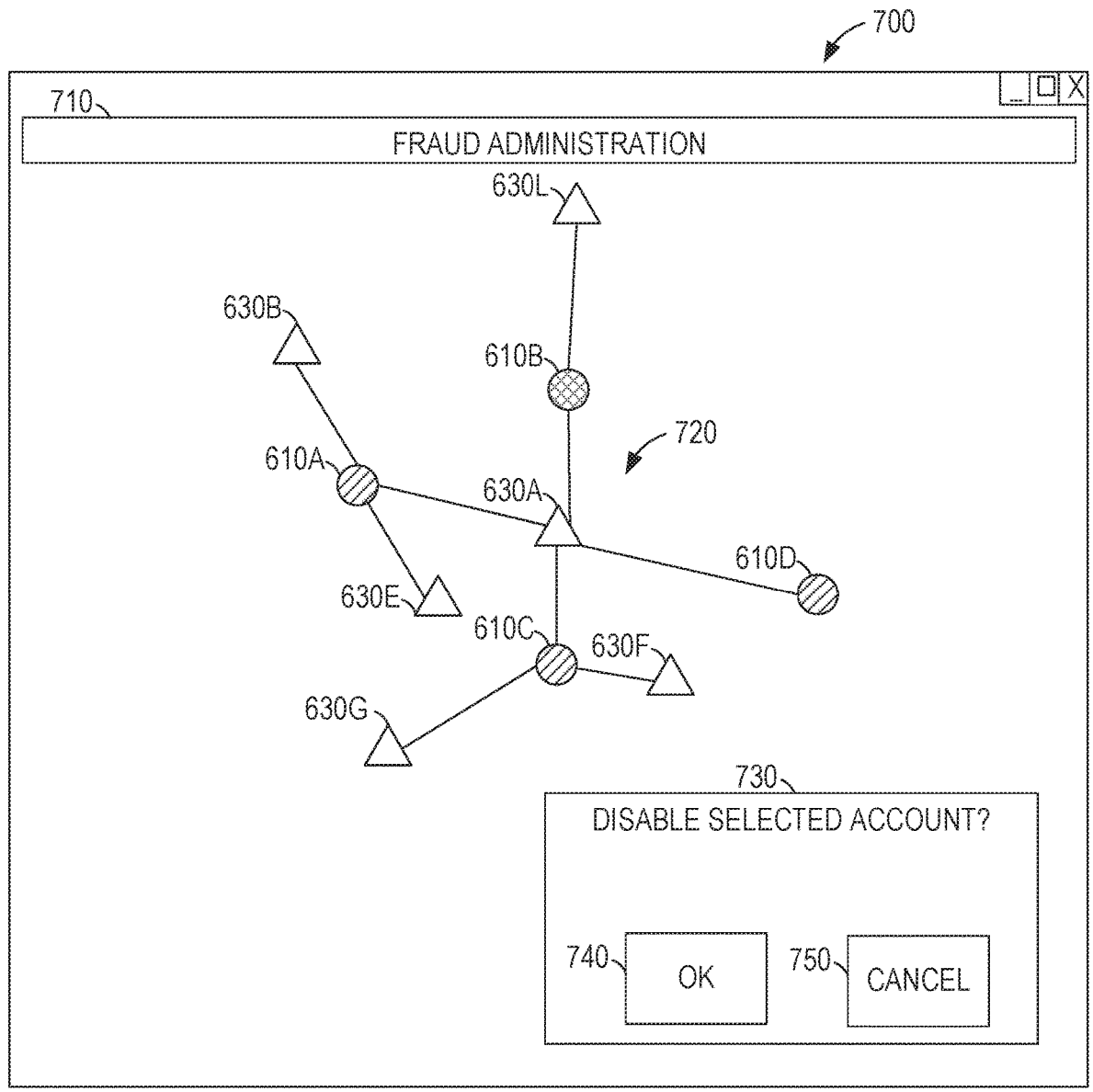
FIG. 7 is a block diagram illustrating a user interface suitable for interacting with a fraud detection system, according to some example embodiments.

FIG. 7 is a block diagram illustrating a user interface 700 suitable for interacting with a fraud detection system, according to some example embodiments. The user interface 700 includes a title 710, a graph 720, and a control area 730 including buttons 740 and 750. The user interface 700 may be displayed to an administrator. The title 710 displays a title for the user interface 700.

The graph 720 shows a portion of the graph 600. The portion of the graph 600 that is displayed may be controlled by the user. For example, the UI module 265 may detect scrolling or zooming inputs, such as swipes, drags, or mouse wheel inputs, and respond by adjusting the portion of the graph 600 displayed. As another example, the UI module 265 may receive selection criteria (e.g., accounts and objects associated with events within a certain time period, such as the last day, week, month, or year; accounts and objects associated with at least a predetermined number of events; accounts and objects associated with at least a predetermined fraud score; accounts and objects related to a specified account or object, or any suitable combination thereof) and respond by displaying only those nodes associated with accounts and objects that meet the selection criteria.

One or more nodes of the graph 720 may be selectable by the user. For example, the UI module 265 may detect an area selection of multiple nodes, a click or touch on a single node, or any suitable combination thereof and select the corresponding node or nodes. An attribute of the selected node or nodes may be modified to provide a visual indication of the selection. For example, in FIG. 7, the node 610B has a cross-hatch fill pattern that identifies the selected node. The control area 730 indicates one or more actions that can be performed on the accounts and objects represented by the selected node or nodes. Example actions that may be performed include creating an association between an account and an object, deleting an association between an account and an object, deleting an account or object, disabling an account, and adjusting a fraud score associated with an account or object. In the example control area 730, the button 740 is operable to cause the fraud detection system 130 to disable the account associated with the selected node 610B. The button 750 is operable to dismiss the control area 730, to undo the selection of the node 610B, to return to a higher-level menu that provides additional options for manipulation of the selected node, or any suitable combination thereof.

Figure 8:
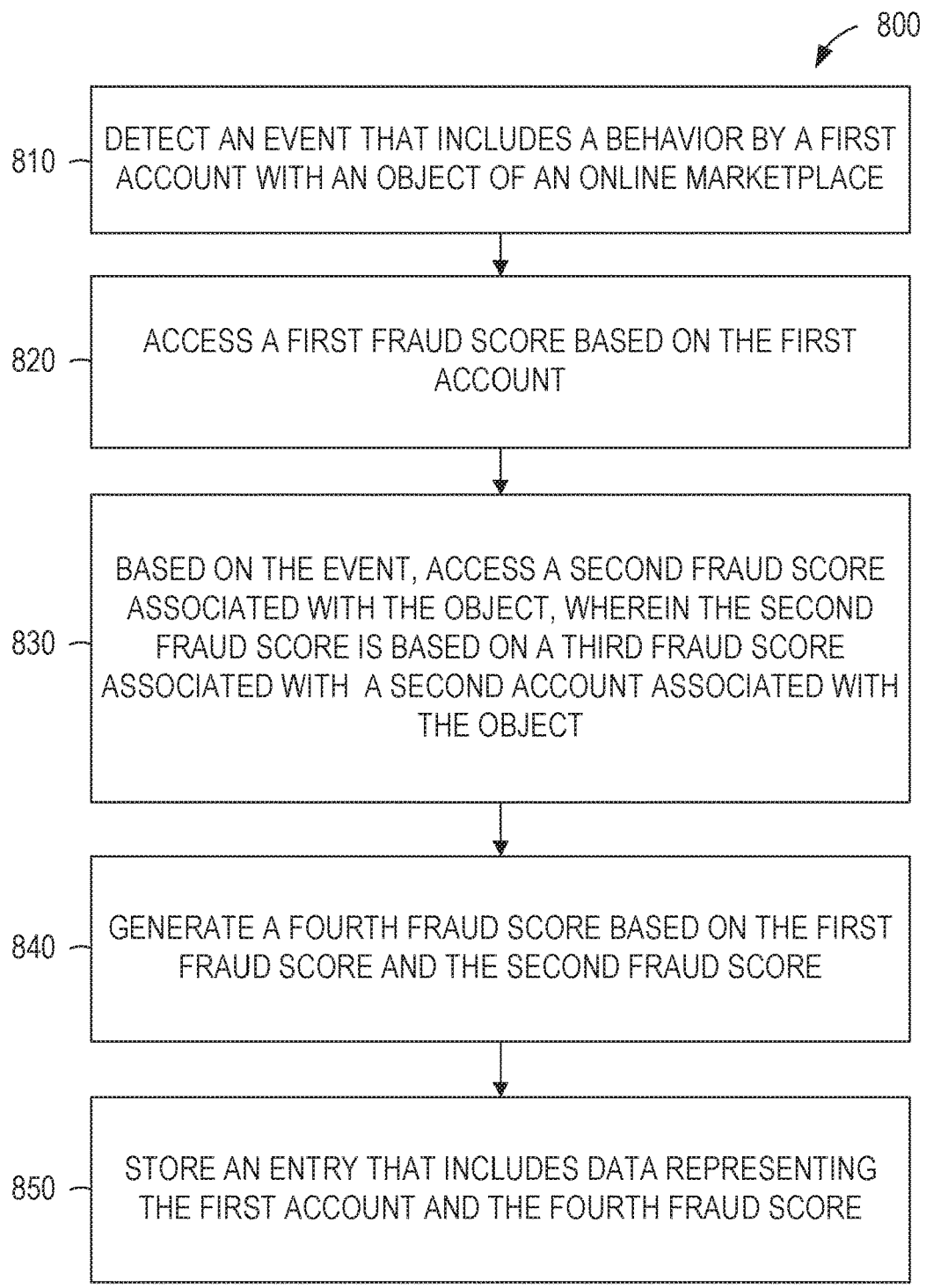
FIG. 8 is a flowchart illustrating operations of a computing device in performing a method of storing an entry based on a fraud score, according to some example embodiments.

FIG. 8 is a flowchart illustrating operations of a computing device in performing a method 800 of storing an entry based on a fraud score, according to some example embodiments. The method 800 includes operations 810, 820, 830, 840, and 850. By way of example and not limitation, the method 800 is described as being performed by the systems of FIG. 1 and the modules of FIG. 2.

In operation 810, the fraud detection module 260 detects an event that includes a behavior by a first account with an object of an online environment. For example, the behavior may be logging into the first account using the object, wherein the object is a computing device.

In operation 820, the fraud detection module 260 accesses a first fraud score based on the first account. For example, based on prior behaviors by the first account, a fraud score may have been generated and stored in the account database 180B, which is accessed by the fraud detection system 130.

In operation 830, the fraud detection module 260 accesses, based on the event, a second fraud score associated with the object, wherein the second fraud score is based on a third fraud score associated with a second account associated with the object. For example, the fraud detection system 130 may query the object database 180J to identify a fraud score associated with the object, wherein the stored fraud score associated with the object is based on data in the login database 180E that identifies a second account that previously used the object to log in, and data from the account database 180B that identifies a third fraud score associated with the second account.

The fraud detection module 260, in operation 840, generates a fourth fraud score based on the first fraud score and the second fraud score. In various example embodiments, the fourth fraud score is the higher of the first fraud score and the second fraud score, an average of the first fraud score and the second fraud score, an output of a recurrent neural network (RNN) that takes the first fraud score and the second fraud score as inputs, or any suitable combination thereof.

The fraud detection module 260, in operation 850, stores an entry that includes data representing the first account and the fourth fraud score. For example, an entry may be added to the event table 310, including an identifier for the first account in the account field and the fourth fraud score in the instance score field.

Figure 9:
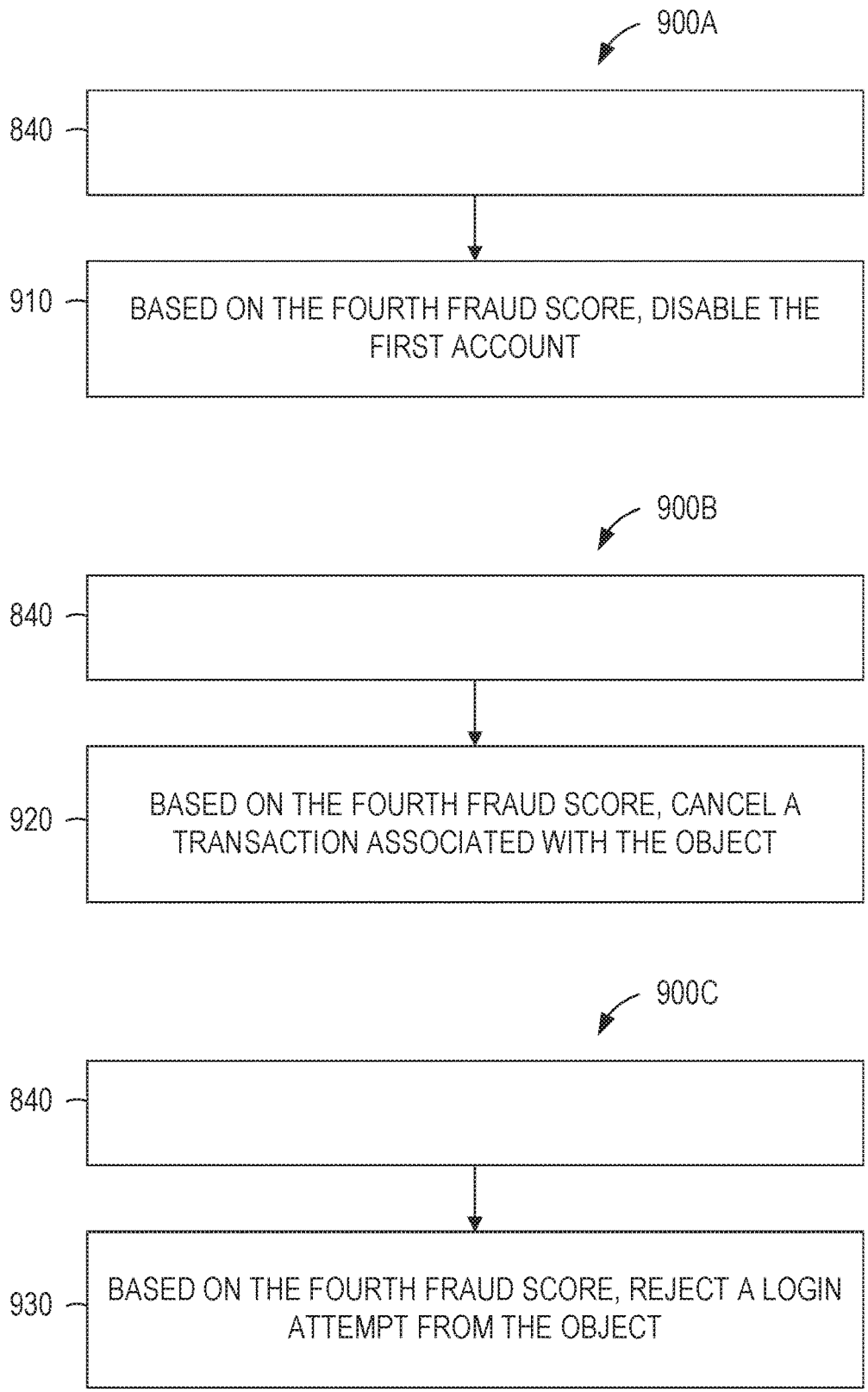
FIG. 9 is a set of flowcharts illustrating operations of a computing device in performing a method of performing an action based on a fraud score, according to some example embodiments.

FIG. 9 is a set of flowcharts illustrating operations of a computing device in performing methods 900A, 900B, and 900C of performing an action based on a fraud score, according to some example embodiments. The method 900A includes operations 840 and 910. The method 900B includes operations 840 and 920. The method 900C includes operations 840 and 930. Operation 840 is described above with respect to FIG. 8. By way of example and not limitation, the methods 900A-900C are described as being performed by the systems of FIG. 1 and the modules of FIG. 2. The operations 910, 920, and 930 may each be performed in addition to or in place of the operation 850 of the method 800. Additionally, operation 910 is performed in conjunction with operation 920 or 930 in some example embodiments.

In operation 910 of the method 900A, the fraud detection module 260 disables the first account based on the fourth fraud score. For example, the fourth fraud score is compared to the fraud detection threshold 420, and based on a result of the comparison (e.g., the fourth fraud score exceeding the fraud detection threshold 420), the first account is disabled. The disabling of the first account may be performed directly by the fraud detection module 260 or by another process. In these example embodiments, the fraud detection module 260, in response to detecting fraud (e.g., the fourth fraud score exceeding the fraud detection threshold 420), updates a data store (e.g., a database, API, RPC, or internal system) to reflect the fraud detection. The other process accesses the data store, determines that the fraud detection module 260 has marked the transaction as fraudulent, and takes appropriate action (e.g., by disabling an account, canceling a purchase, or preventing a login using an object).

In operation 920 of the method 900B, the fraud detection module 260 cancels, based on the fourth fraud score, a transaction associated with the object involved in the behavior of operation 810. For example, the behavior may be a purchase item behavior of the object. In this example, the fourth fraud score is compared to the fraud detection threshold 420, and based on a result of the comparison (e.g., the fourth fraud score exceeding the fraud detection threshold 420), the purchase of the object is canceled.

In operation 930 of the method 900C, the fraud detection module 260 rejects, based on the fourth fraud score, a login attempt from the object involved in the behavior of operation 810. For example, the behavior is a login attempt using the object to connect. In this example, the fourth fraud score is compared to the fraud detection threshold 420, and based on a result of the comparison (e.g., the fourth fraud score exceeding the fraud detection threshold 420), the login attempt is rejected, a future login attempt using the object is rejected, or any suitable combination thereof.

Figure 10:
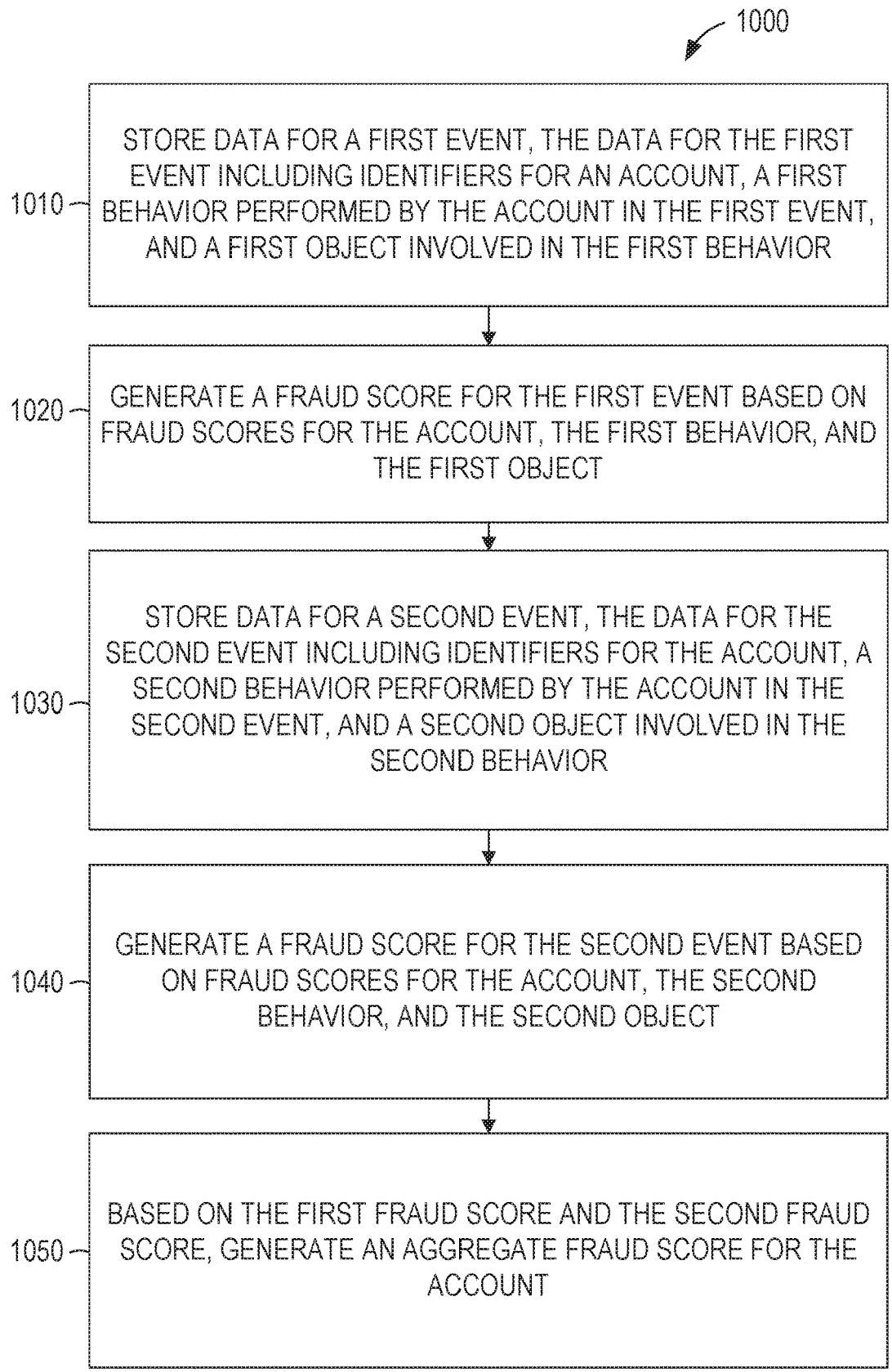
FIG. 10 is a flowchart illustrating operations of a computing device in performing a method of generating an aggregate fraud score for an account, according to some example embodiments.

FIG. 10 is a flowchart illustrating operations of a computing device in performing a method 1000 of generating an aggregate fraud score for an account, according to some example embodiments. The method 1000 includes operations 1010, 1020, 1030, 1040, and 1050. By way of example and not limitation, the method 1000 is described as being performed by the systems of FIG. 1 and the modules of FIG. 2.

In operation 1010, the fraud detection module 260 stores data for a first event, the data for the first event including identifiers for an account, a first behavior performed by the account in the first event, and a first object associated with the first behavior. For example, the row 330A may be stored in the event table 310, including an account identifier, a behavior identifier, and an object identifier.

In operation 1020, the fraud detection module 260 generates a fraud score for the first event based on fraud scores for the account, the first behavior, and the first object. For example, a fraud score for the first event may be generated and stored in the row 330A as an instance score. The generating of each fraud score discussed herein may include normalizing the fraud score. For example, the algorithm used to generate the fraud score for the account may have an output in the range of 0-999 while the algorithm used to generate the fraud score for the first behavior may have an output in the range of 1-100. The fraud scores may be normalized to have the same range (e.g., 0.0-1.0) prior to initial storage (e.g., in the account database 180B, the behavior database 180F, and the object database 180J) or after being accessed by the fraud detection module 260 to generate the fraud score for the event.

The fraud detection module 260, in operation 1030, stores data for a second event, the data for the second event including identifiers for the account, a second behavior performed by the account in the second event, and a second object associated with the second behavior. For example, the row 330D may be stored in the event table 310, including the same account identifier as the row 330A, a behavior identifier, and an object identifier.

In operation 1040, the fraud detection module 260 generates a fraud score for the second event based on fraud scores for the account, the second behavior, and the second object. For example, a fraud score for the second event may be generated and stored in the row 330D as an instance score.

In operation 1050, the fraud detection module 260 generates an aggregate fraud score for the account based on the first fraud score and the second fraud score. The first event and the second event may be aggregated based on the two events involving the same object, the same account, or both. Additionally, the first event and the second event may be aggregated based on the two events occurring within a predetermined period of time of each other. For example, events for an account viewing an item listed for sale (first event) and purchasing the item (second event) less than a day after viewing the item may be aggregated.

An entry for the account in the account database 180B may be updated to store the generated aggregate fraud score. The generated fraud score may be determined as a maximum, minimum, or average value of the fraud scores for the events; may be an output from a binary classifier (e.g., a random forest classifier, a logistic regression, a deep neural network (DNN), a recurrent neural network (RNN), or a long short term memory (LSTM)) that takes the first and second fraud scores as inputs; may be an output from a regression continuous score (e.g., a linear regression, a least absolute shrinkage and selection operator (LASSO), or ridge regression); may be increased or decreased from an existing fraud score for the account based on the results of comparisons of the event fraud scores with one or more predetermined thresholds; or any suitable combination thereof.

Figure 11:
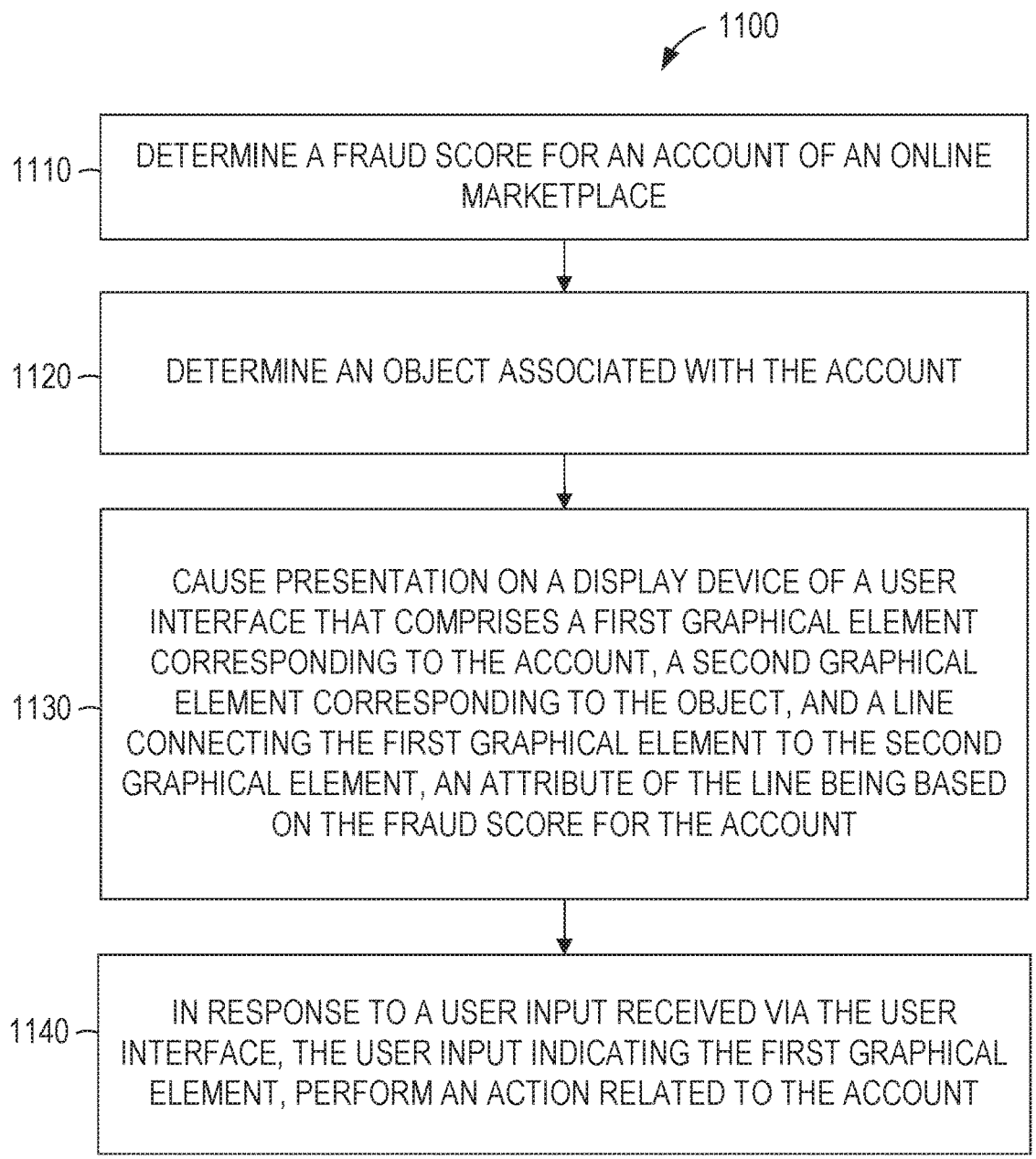
FIG. 11 is a flowchart illustrating operations of a computing device in performing a method of receiving and responding to user input in a user interface for a fraud detection system, according to some example embodiments.

FIG. 11 is a flowchart illustrating operations of a computing device in performing a method 1100 of receiving and responding to user input in a user interface for a fraud detection system, according to some example embodiments.

The method 1100 includes operations 1110, 1120, 1130, and 1140. By way of example and not limitation, the method 1100 is described as being performed by the systems of FIG. 1 and the modules of FIG. 2.

In operation 1110, the fraud detection module 260 determines a fraud score for an account of an online environment. For example, data from the account database 180B may be accessed to determine the fraud scores for an account.

In operation 1120, the fraud detection module 260 determines an object associated with the account. For example, data from the event database 180K may be accessed to identify one or more objects referenced in event records that also reference the account.

The user interface module 265, in operation 1130, causes presentation on a display device of a user interface that comprises a first graphical element, a second graphical element, and a line connecting the two graphical elements. The first graphical element corresponds to the account and the second graphical element corresponds to the object. An attribute of the line is based on the fraud score for the account. As an example, the user interface 700 includes the nodes 630A and 610A, which are graphical elements. The user interface 700 also includes a line connecting the two nodes 630A and 610A. In operation 1130, the connecting line is displayed with an attribute that is based on the fraud score of the account corresponding to the node 610B. For example, the color of the line may be red if the fraud score for the account exceeds a predetermined threshold or black if the fraud score for the account does not exceed the threshold.

In operation 1140, the user interface module 265 receives a user input that indicates the first graphical element. In response, the fraud detection module 260 performs an action related to the account. Example actions include disabling the account, canceling a transaction involving the account, modifying a fraud score associated with the account, creating an association between the account and an object, removing an association between the account and an object, displaying additional information related to the account, or any suitable combination thereof.

Figure 12:
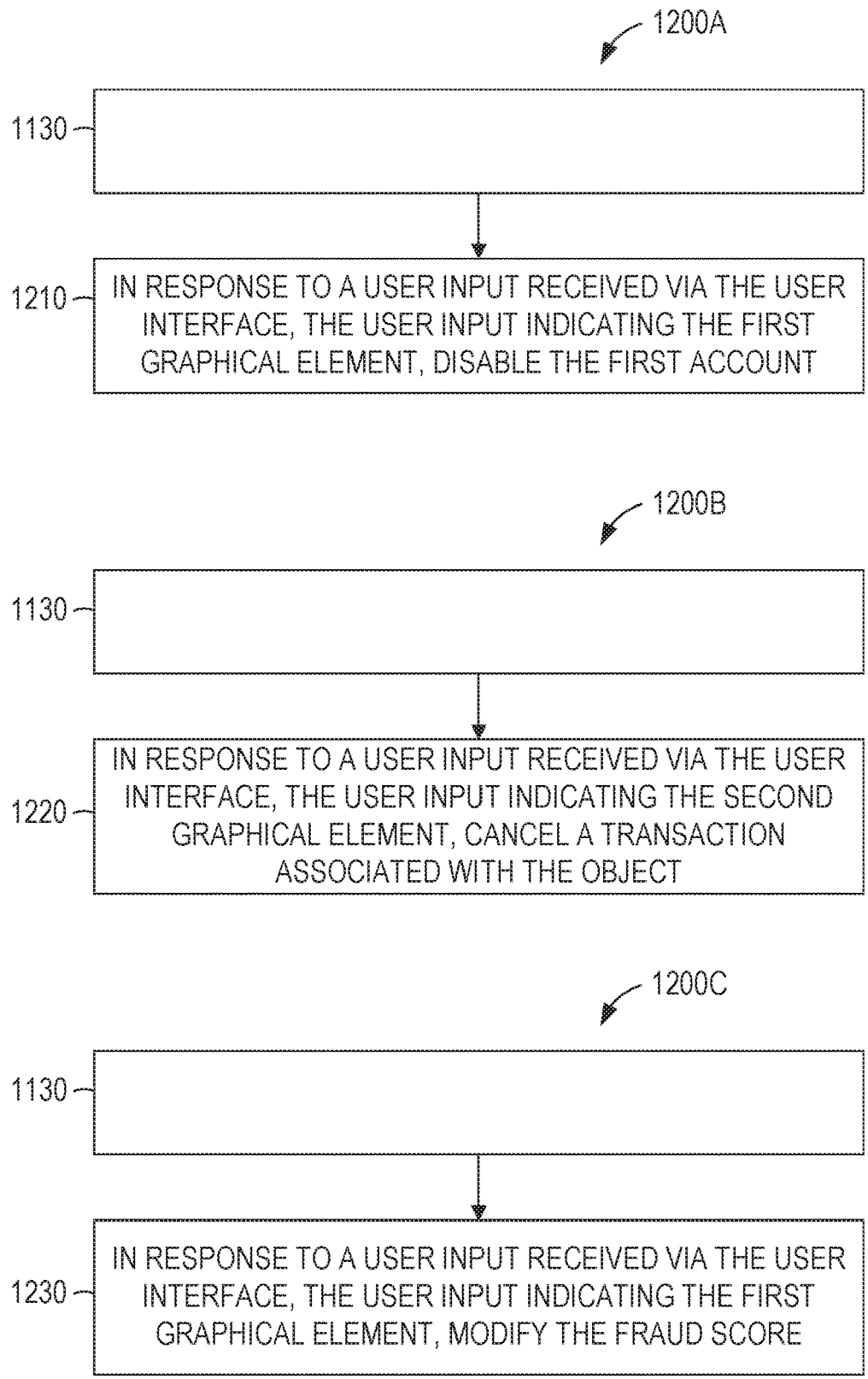
FIG. 12 is a set of flowcharts illustrating operations of a computing device in performing a method of receiving and responding to user input in a user interface for a fraud detection system, according to some example embodiments.

FIG. 12 is a set of flowcharts illustrating operations of a computing device in performing methods 1200A, 1200B, and 1200C of receiving and responding to user input in a user interface for a fraud detection system, according to some example embodiments. The method 1200A includes operations 1130 and 1210. The method 1200B includes operations 1130 and 1220. The method 1200C includes operations 1130 and 1230. Operation 1130 is described above with respect to FIG. 11. By way of example and not limitation, the methods 1200A-1200C are described as being performed by the systems of FIG. 1 and the modules of FIG. 2. The operations 1210, 1220, and 1230 may each be performed in addition to or in place of the operation 1140 of the method 1100. Additionally, operation 1210 is performed in conjunction with operation 1220 or 1230 in some example embodiments.

In operation 1210 of the method 1200A, the fraud detection module 260 disables the first account in response to a user input received via the user interface, the user input indicating the first graphical element. For example, the button 740 is selected by the user, generating a message from the device 140C on which the user interface 700 is displayed to the fraud detection system 130 via the network 170. The message includes an identifier of the selected node 610B or a reference to a previously-sent identifier of the selected node 610B. The user interface module 265 receives the message and generates an instruction to the fraud detection module 260 to perform an action related to the account. In the example of the method 1200A, the action is to disable the account. A disabled account is prevented from being used to log in to the online commerce system, prevented from listing items for sale, prevented from purchasing items, or any suitable combination thereof.

In operation 1220 of the method 1200B, the fraud detection module 260 cancels a transaction associated with the object determined in operation 1120 in response to a user input received via the user interface, the user interface indicating the second graphical element. For example, the row 330B in the event table 310 is used in the method 1100 to identify the association between the account of the first graphical element and the object of the second graphical element. The row 330B in the event table 310 stores an event for a purchase item behavior. By selecting the object, the link, or the account in the user interface 700 and sending a cancel transaction command, the user requests that the transaction be canceled. In response to receiving a corresponding message from the device 140C displaying the user interface 700, the fraud detection module 260 cancels the purchase of the object.

In operation 1230 of the method 1200C, the fraud detection module 260 modifies the fraud score determined in operation 1110. The modification is performed in response to a user input received via the user interface 700, the user input indicating the first graphical element. For example, the selected node 610B, corresponding to the account of methods 1100 and 1200C, may be indicated in a command to increase or decrease the fraud score associated with the account. In response, the fraud detection module 260 updates the account database 180B by modifying the fraud score for the account.

Figure 13:
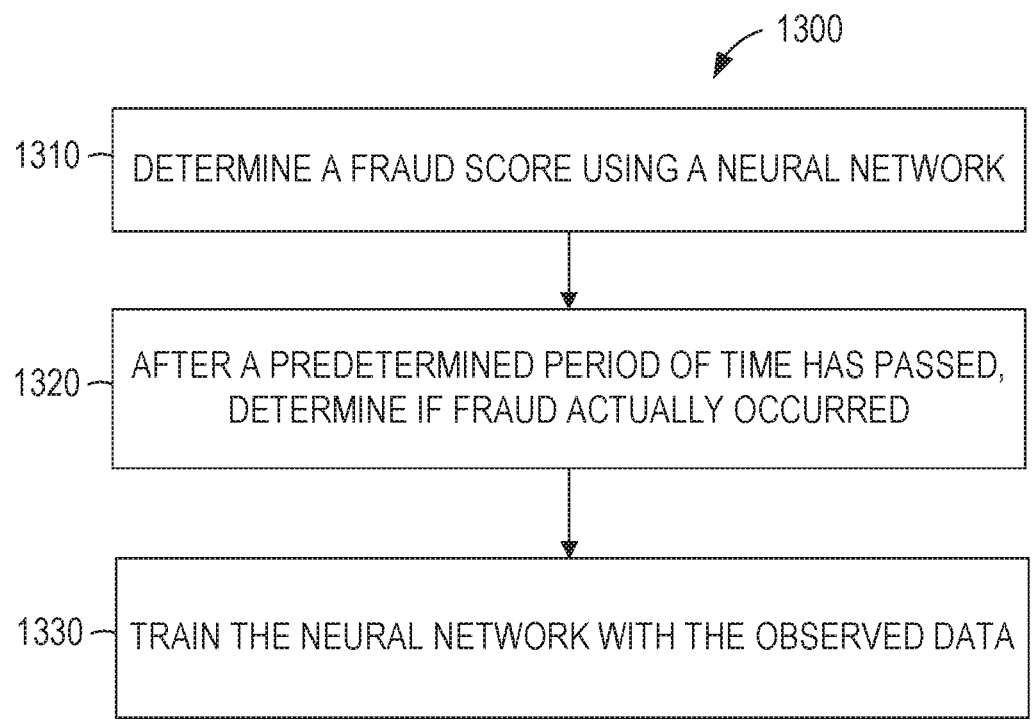
FIG. 13 is a flowchart illustrating operations of a computing device in performing a method of determining a fraud score using a neural network, according to some example embodiments.

FIG. 13 is a flowchart illustrating operations of a computing device in performing a method 1300 of determining a fraud score using a neural network, according to some example embodiments. The method 1300 includes operations 1310, 1320, and 1330. By way of example and not limitation, the method 1300 is described as being performed by the systems of FIG. 1 and the modules of FIG. 2.

In operation 1310, the fraud detection module 260 determines a fraud score using a neural network. The fraud score may be any type of fraud score, such as an account fraud score, an object fraud score, a behavior fraud score, an event fraud score, or an aggregate fraud score. The neural network may be any type of neural network, such as a DNN, an RNN, or an LSTM.

In operation 1320, after a predetermined period of time has passed, the fraud detection module 260 determines if fraud actually occurred. The predetermined period of time may be any period of time, such as a day, a week, a month, six months, or one year. The determination of whether fraud actually occurred may be based on user feedback. For example, a complaint may be received from a buyer account indicating that the item received was not the item indicated in the listing, a complaint may be received from a seller account indicating that payment from the buyer was not received, positive feedback may be received from the buyer account indicating that a transaction was successful, positive feedback may be received from the seller account indicating that the transaction was successful, or any suitable combination thereof.

In operation 1330, the fraud detection module 260 trains the neural network with the observed data. For example, the original input data to the neural network is provided to the neural network again, this time with the additional value of the observed fraud score (e.g., 0.0 if fraud was not observed and 1.0 if fraud was observed).

Figure 14:
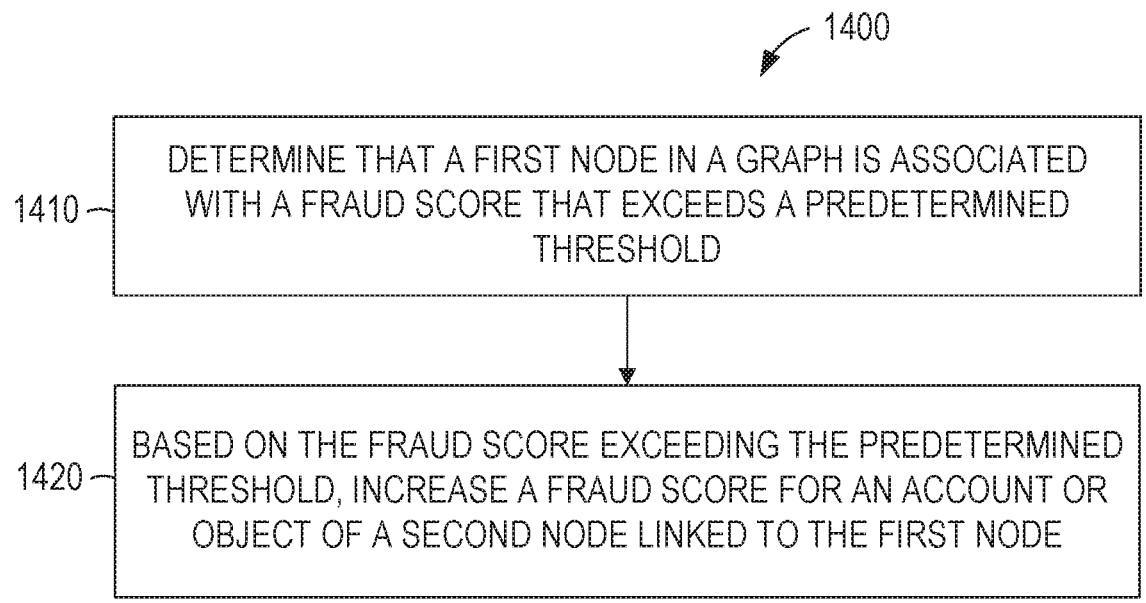
FIG. 14 is a flowchart illustrating operations of a computing device in performing a method of modifying a fraud score, according to some example embodiments.

FIG. 14 is a flowchart illustrating operations of a computing device in performing a method 1400 of modifying a fraud score, according to some example embodiments. The method 1400 includes operations 1410 and 1420. By way of example and not limitation, the method 1400 is described as being performed by the systems of FIG. 1 and the modules of FIG. 2.

In operation 1410, the fraud detection module 260 determines that a first node in a graph is associated with a fraud score that exceeds a predetermined threshold. For example, the graph 500 is accessed and traversed to identify the node 510A, associated with an account having a fraud score that exceeds the predetermined threshold.

In operation 1420, the fraud detection module 260, based on the fraud score associated with the first node exceeding the predetermined threshold, increases a fraud score for an account or object of a second node linked to the first node. For example, a fraud score of the object associated with the node 520A is increased, based on the fraud score for the account associated with the node 510A having a fraud score that exceeds the predetermined threshold. In some example embodiments, the fraud score for the accounts or objects associated with each of the nodes linked to the first node are increased. Thus, in this example, the fraud scores for the objects associated with the nodes 520A, 520B, and 520C would be increased.

The method 1400 may be performed periodically (e.g., every day, every week, every month, or every year), may be performed on all nodes in the graph that exceed the predetermined threshold (e.g., by traversing the graph to identify all such nodes), or any suitable combination thereof.

The methods and techniques disclosed herein have no real-world analogs. The level of effort required to implement the indirect and aggregate fraud detection methods described herein precludes practical human-only implementation, but provides real benefits to online retailers and their users. Existing methods, such as identifying accounts, shipping addresses, IP addresses, and products associated with fraud, only block the use of the identified account, address, or product after the account, address, or product has been used to commit fraud. By contrast, by using more remote associations as described herein, a fraudulent transaction may be prevented even if the accounts, addresses, or product involved have not been previously directly involved in fraud. By detecting fraudulent transactions that prior art systems would miss, the systems and methods described herein eliminate the expenditure of computing resources that would be spent in completing the fraudulent transactions and in resolving post-transaction disputes. The technical consideration of the teachings provided herein provide an efficient solution to transcend the inefficiencies and crude approaches of the prior art.

When these effects are considered in aggregate, one or more of the methodologies described herein may obviate a need for certain efforts or resources that otherwise would be involved in detecting fraud. Efforts expended by an administrator in detecting fraud may also be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Modules, Components, and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   determining, by one or more processors, a fraud score for a first account of a user of an online marketplace;
   determining that the first account and a second account have both used data included in an item listing, the item listing describes an item for sale at the online marketplace;
   based on the first account and the second account having both used the data, causing presentation, at a user interface, of:
   a first graphical element that represents an identity of the first account;
   a second graphical element that represents an identity of the data included in the item listing;
   a first line connecting the first graphical element to the second graphical element, an attribute of the first line being based on the fraud score for the first account;
   a third graphical element that represents an identity of the second account;
   a second line connecting the second graphical element to the third graphical element, wherein the first graphical element, the second graphical element, the first line, the third graphical element, and the second line indicates that both the first account and the second account have used the data included in the item listing; and
   in response to a user input received via the user interface, performing an action related to the first account, wherein the action comprises at least one of: canceling a transaction, or disabling the first account, the user input indicating the first graphical element.

2. The method of claim 1, wherein an attribute of the second line is based on a fraud score for the second account.

3. The method of claim 2, further comprising based on the first account and the second account having both used the data included in the item listing and based on the fraud score for the first account exceeding a threshold, modifying the fraud score for the second account.

4. The method of claim 1, wherein the action comprises modifying the fraud score.

5. The method of claim 1, wherein the action comprises associating the first account with a second object.

6. The method of claim 1, wherein the first account is a seller account.

7. The method of claim 1, wherein the object corresponds to an item that is for sale via the online marketplace.

8. The method of claim 1, wherein the object is used by the first account to connect to the online marketplace.

9. The method of claim 1, wherein the object is at least one of: an address used by the first account and the second account, a price of an item, or a shipping address.

10. The method of claim 1, wherein a second attribute of the first line represents a strength of a relationship between the first account and the object.

11. The method of claim 10, wherein the second attribute of the first line is a thickness of the first line.

12. The method of claim 1, wherein the attribute of the first line is the color of the first line.

13. The method of claim 1, wherein the first graphical element is larger than the second graphical element.

14. The method of claim 1, wherein an attribute of the first graphical element is based on the fraud score for the first account.

15. A system comprising:
   a memory that stores instructions; and
   one or more processors that execute the instructions to perform operations comprising:

determining a fraud score for a first account of a user of an online marketplace;

determining that the first account and a second account have both used data included in an item listing, the item listing describes an item for sale at the online marketplace;

in response to the determining of the fraud score and the determining that the first account and the second account have both used data included in the item listing, causing presentation on a display device of a user interface that comprises:

a first graphical element that represents an identity of the first account;

a second graphical element that represents an identity of the data included in the item listing;

a first line connecting the first graphical element to the second graphical element, an attribute of the first line being based on the fraud score for the first account;

a third graphical element that represents an identity of the second account;

a second line connecting the second graphical element to the third graphical element, wherein the first graphical element, the second graphical element, the first line, the third graphical element, and the second line indicates that both the first account and the second account have used the data included in the item listing; and in response to a user input received via the user interface, performing an action related to the first or second account, wherein the action comprises at least one of: canceling a transaction, or disabling the first account or the second account.

16. The system of claim 9, wherein based on the first account and the second account both using the data, the fraud score for the second account is based on the fraud score for the first account.

17. A non-transitory machine-readable medium that stores instructions that, when executed by one or more processors of a machine, cause the machine to perform operations comprising:

determining a fraud score for a first account of a user of an online marketplace;

determining that the first account and a second account have both used data included in an item listing, the item listing describes an item for sale at the online marketplace;

based at least in part on the determining that the first account and the second account have both used data included in the item listing, causing presentation on a display device of a user interface that comprises:

a first graphical element that represents an identity of the first account;

a second graphical element that represents an identity of the data included in the item listing;

a first line connecting the first graphical element to the second graphical element, an attribute of the first line being based on the fraud score for the first account;

a third graphical element that represents an identity of the second account;

a second line connecting the second graphical element to the third graphical element, wherein the first graphical element, the second graphical element, the first line, the third graphical element, and the second line indicates that both the first account and the second account have used the data included in the item listing; and in response to a user input received via the user interface, performing an action related to the first account or the second account, wherein the action comprises at least one of: canceling a transaction, or disabling the first account or the second account.

* * * * *